United States Patent
Berman et al.

[11] Patent Number: 6,164,428
[45] Date of Patent: Dec. 26, 2000

[54] WRAP SPRING SHADE OPERATOR

[75] Inventors: Joel Berman, Hewlett; Vincent J. Brown, Valley Stream; Victor Erlikh, Brooklyn; John Wilk, SI, all of N.Y.

[73] Assignee: Joel Berman Associates, Inc., Long Island City, N.Y.

[21] Appl. No.: 09/379,065

[22] Filed: Aug. 23, 1999

[51] Int. Cl.⁷ .............................. E06B 9/56; F16D 13/08
[52] U.S. Cl. .................. 192/223.4; 192/41 S; 192/81 C; 160/298; 160/321
[58] Field of Search ................................ 192/223.4, 41 S, 192/81 C; 160/298, 321; 188/82.6, 77 W; 267/155

[56] References Cited

U.S. PATENT DOCUMENTS

| | | |
|---|---|---|
| 185,763 | 12/1876 | Lake . |
| 1,196,725 | 8/1916 | Tropp et al. . |
| 1,841,384 | 1/1932 | Schmelz . |
| 3,135,369 | 6/1964 | Nisenson et al. . |
| 3,220,523 | 11/1965 | Hepner ............................... 192/41 S X |
| 4,168,735 | 9/1979 | Frei . |
| 4,321,992 | 3/1982 | Gallo . |
| 4,372,432 | 2/1983 | Waine et al. . |
| 4,433,765 | 2/1984 | Rude et al. . |
| 4,535,829 | 8/1985 | Fukuchi . |
| 4,673,073 | 6/1987 | Weatherby . |
| 4,751,953 | 6/1988 | Appel et al. . |
| 4,779,662 | 10/1988 | Wilk . |
| 4,782,593 | 11/1988 | Kieser et al. . |
| 4,817,771 | 4/1989 | Iten . |
| 4,892,175 | 1/1990 | Van Erden et al. . |
| 4,953,676 | 9/1990 | Yamada et al. . |
| 4,976,417 | 12/1990 | Smith . |
| 5,133,437 | 7/1992 | Larson . |
| 5,191,946 | 3/1993 | Lyon et al. . |
| 5,318,161 | 6/1994 | Lyga . |
| 5,361,822 | 11/1994 | Nijs . |
| 5,375,643 | 12/1994 | Rude . |
| 5,482,105 | 1/1996 | Rude . |
| 5,669,432 | 9/1997 | Nisenson et al. . |
| 5,791,393 | 8/1998 | Judkins . |

Primary Examiner—Richard M. Lorence
Attorney, Agent, or Firm—Snell & Wilmer L.L.P.

[57] ABSTRACT

A shade positioning system which employs a wrap spring clutch system includes a shade operator, a shade roller, and an idle end bracket for supporting the shade roller when mounted. The shade operator includes a self-lubricating central stud around which a helical coil spring is wrapped, a manually operated pulley mounted on the wrap spring, and a support bushing to ensure positive engagement of the aforementioned elements. The central stud is composed of a plastic or metal, which allows the smooth rotation of the wrap spring around the stud. The tangs of the wrap spring project substantially radially outward from the spring central axis, and are shaped to accommodate for the coefficient of friction between the stud and the spring. A first preferred spring construction allows for decreased spring surface area to contact the stud. A second preferred spring construction allows for an increased spring surface area to contact the stud. Further, the bushing is provided is with a projection which engages the wrap spring due to the weight of the shade. This engagement causes the spring to further grip the stud preventing pulley rotation.

12 Claims, 8 Drawing Sheets

WRAP SPRING SHADE OPERATOR

FIELD OF THE INVENTION

The present invention relates to a device for operating and positioning a window shade, and more particularly, to a manually operated shade positioning system incorporating a wrap spring clutch system.

BACKGROUND OF THE INVENTION

Many variations of wrap spring clutch systems for the operation of window shades have been developed and are familiar to those skilled in the art. These clutch systems typically employ a fixed cylindrical core shaft or stud about which a helical coil spring is positioned, a rotary drive member capable of controlling the inner diameter of the coil spring, and a bushing adapted to ensure engagement of the shaft, spring, and rotary members. During operation of the typical wrap spring system, the rotation of the rotary drive member increases the inner diameter of the wrap spring, which reduces the friction between the core shaft and wrap spring, thereby allowing the lowering or raising of the window shade as desired.

U.S. Pat. No. 4,779,662 issued to Wilk on Oct. 25, 1988 is a typical example of a window shade wrap spring clutch systems found in the prior art. The Wilk patent discloses a stationary stud upon which is wound a wrap spring, wherein the wrap spring normally hugs or binds against the stud. A drive member in the form of a pulley is positioned around the stud and wrap spring, such that, once the pulley is rotated, the pulley inner bore can be placed in contact with one radially-extended tang of the wrap spring. A "tang" is the end of the wrap spring extending radially from the circumference of the spring. During operation, the pulley is rotated manually by means of a ball-chain. The manual rotation of the pulley causes the pulley inner bore to contact a first wrap spring tang. Continued rotation of the pulley separates the spring tangs, thereby enlarging the effective inside diameter of the spring, allowing the spring to slip and rotate about the core shaft. The portion of the wrap spring opposite the contacted tang slides along the core shaft member creating a friction drag, which serves to stabilize the raising and lowering of the window shade during operation.

While the friction drag helps to smooth the movement of the wrap spring clutch system, it usually does not eliminate the jerky motion, which is often inherent in the operation of wrap spring clutch systems. This inherent jerky motion typically occurs when the clutch system is operated in "overrunning" mode, wherein the weight of an overrunning load, such as a shade, torques the drive member in the same direction as the torque being applied by the drive member. This overrunning load can cause the system wrap spring to intermittently store and release energy during the operation of the clutch. This intermittent energy transfer produces a jerky motion that is sometimes called "stair-stepping," during which the overrunning load drops by a small, finite distance then halts, then resumes dropping (analogous to the motion of an object descending a flight of stairs).

Previous attempts at reducing the effect of stair-stepping in wrap spring clutch systems have met with little success. For example, U.S. Pat. No. 4,433,765, issued Feb. 28, 1984 to E. Rude et al., attempts to eliminate stair-stepping by teaching a spring clutch system which uses multiple springs disposed between two coaxial mounted cylindrical elements, wherein the springs are designed to slip so that all of the springs support the overrunning load. Effective operation of the Rude patent depends on the designer's ability to determine the effective slip torque between the spring and the core shaft, where the slip torque value varies with the interference between the outside diameter of the shaft to the inside diameter of the relaxed spring to core shaft diameter ratio. However, the Rude patent is limited in that it ignores the difficulty in controlling spring tolerances in view of the various annealing and plating procedures typically required to avoid corrosion. Annealing and plating of metal springs often results in a lack of uniformity in spring dimension and absolute stiffness, from unit to unit. This lack of spring uniformity makes it extremely difficult to calculate the correct slip torque needed to ensure that the system will operate within design parameters. Consequently, the springs of the multiple spring system seldom open according to designer calculations. This unpredictable spring performance often causes the springs to grab unevenly which typically increases the inherent stair-stepping condition.

The prior art also reveals an attempt by inventors to use nonmetallic wrap springs in the wrap spring clutch design in an effort to eliminate the stair-stepping effect. For example, U.S. Pat. No. 5,669,432, issued Sep. 23, 1997, to J. Nisenson et al., teaches away from using metal in the construction of the wrap spring clutch system. To aid in eliminating the clutch system stair-stepping effect, the Nisenson patent uses molded plastic in the construction of the core shaft and the wrap spring members. The Nisenson patent seeks to eliminate the stair-stepping effect, by controlling the chemical composition of both the wrap spring and the stud in an attempt to improve the frictional engagement between the spring and stud members. Nisenson teaches incorporating in the plastic specific chemical additives that can effect the plastic's physical characteristics, such as stiffness, fatigue strength, wear, stretch and compression coefficients. The Nisenson patent is limited in that it uses a plastic wrap spring construction which is typically not as rugged and reliable over extended periods of operation as the clutch systems using metal springs. This lack of ruggedness and reliability is inherent in plastic springs and often leads to an increase in the relaxed inside diameter of the spring over extended usage, which, in turn, commonly increases the stair-stepping effect.

Therefore, there is a need for a wrap spring clutch system with diminished stair-stepping effect, wherein the clutch system uses a single spring and is therefore not dependant on wrap spring uniformity and tolerances. A need also exists for a wrap spring clutch system with improved frictional engagement between the wrap spring and stud members, and which also has the ruggedness and reliability necessary to withstand extended use.

SUMMARY OF THE INVENTION

A wrap spring clutch system operates a window shade with improved frictional engagement between the spring and stud members, wherein the system utilizes a single spring in its construction and substantially eliminates "stair-stepping" while remaining rugged and reliable over extended use. The wrap spring clutch system comprises a housing unit with a fixed cylindrical stud, a metal helical coil wrap spring wound around the stud, the spring having tangs which radiate substantially outward from the spring central axis, wherein the spring has a sufficiently relaxed inner diameter to allow the spring to hug or bind against the stud, a rotary drive member mounted to rotate about the core shaft and the spring, the rotary drive member being adapted to adjust the inner diameter of the spring and a bushing adapted to ensure positive engagement of the stud, spring, and rotary members. The wrap spring clutch system is operated manually.

A clutch device is provided on the stud between the rotary drive member and the stud such that free rotation of the bushing and the rotary member is precluded by the wrap spring's frictional forces against the stud. The weight of a load, such as a shade, tends to increase the engagement between spring and stud, while the manual operation of the clutch system causes the drive member to rotate and lessen the clutch action between the spring and the stud. Cessation of the manual operation of the system reengages the clutch, thereby maintaining the shade in a desired position.

BRIEF DESCRIPTION OF THE DRAWINGS

The present invention will now be described in connection with the appended drawing figuers, wherein like numerals represent like elements, and.

DETAILED DESCRIPTION OF PREFERRED EMBODIMENTS

Figure 1:
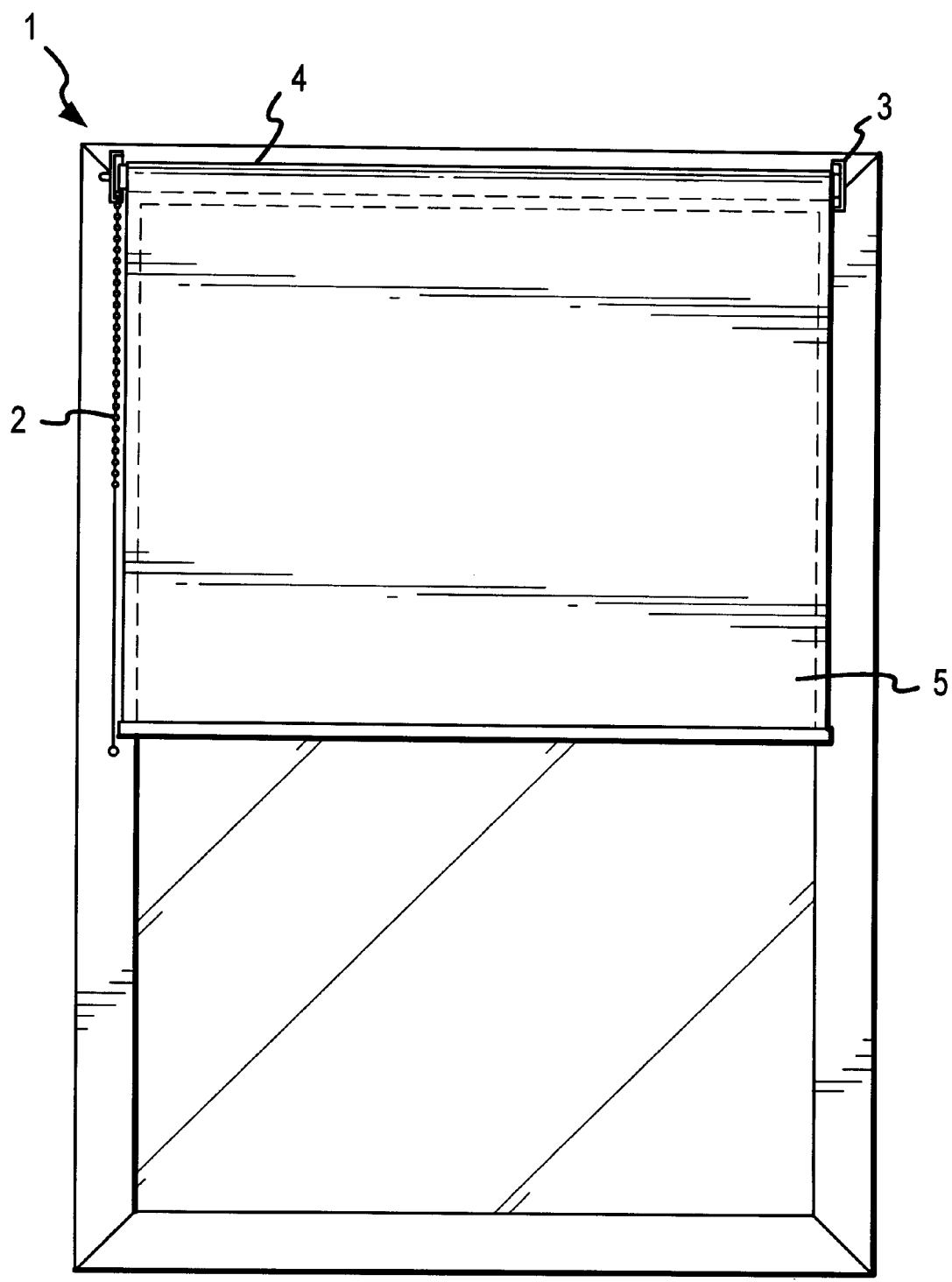
FIG. 1 shows the present invention installed in an exemplary conventional window frame.

The present invention preferably includes a wrap spring clutch system which can be used to control the position of any object, device, material, shade, door and/or the like, wherein the system substantially eliminates or reduces the stair-stepping effect during operation of the system. With respect to FIG. 1, a front view of a preferred embodiment of the system installed in a window is shown. This preferred embodiment includes, generally, a shade operator 1 having a chain 2 for operating the shade operator 1, a shade 5, which can be raised or lowered as desired by the rotating motion of shade operator 1, a spool 4 upon which shade 5 is rolled, and a back bracket 3 for holding the spool 4 in place between shade operator 1 and bracket 3, during operation of the invention. Shade roller 4, shade 5, and back bracket 3 are preferably of conventional construction, and are positioned to fit within the frame of a conventional window.

While a preferred embodiment of the invention is depicted operating a window shade, one skilled in the art will appreciate that the present invention can also be used in any embodiment requiring the raising and/or lowering of any object, device, material, shade, door and/or the like. With respect to the preferred embodiment of a shade, a "shade" as used herein includes, for example, any cloth, animal skin, metal, plastic, plant material and/or the like, which can be raised or lowered using a wrap spring clutch roller system.

Figure 2:
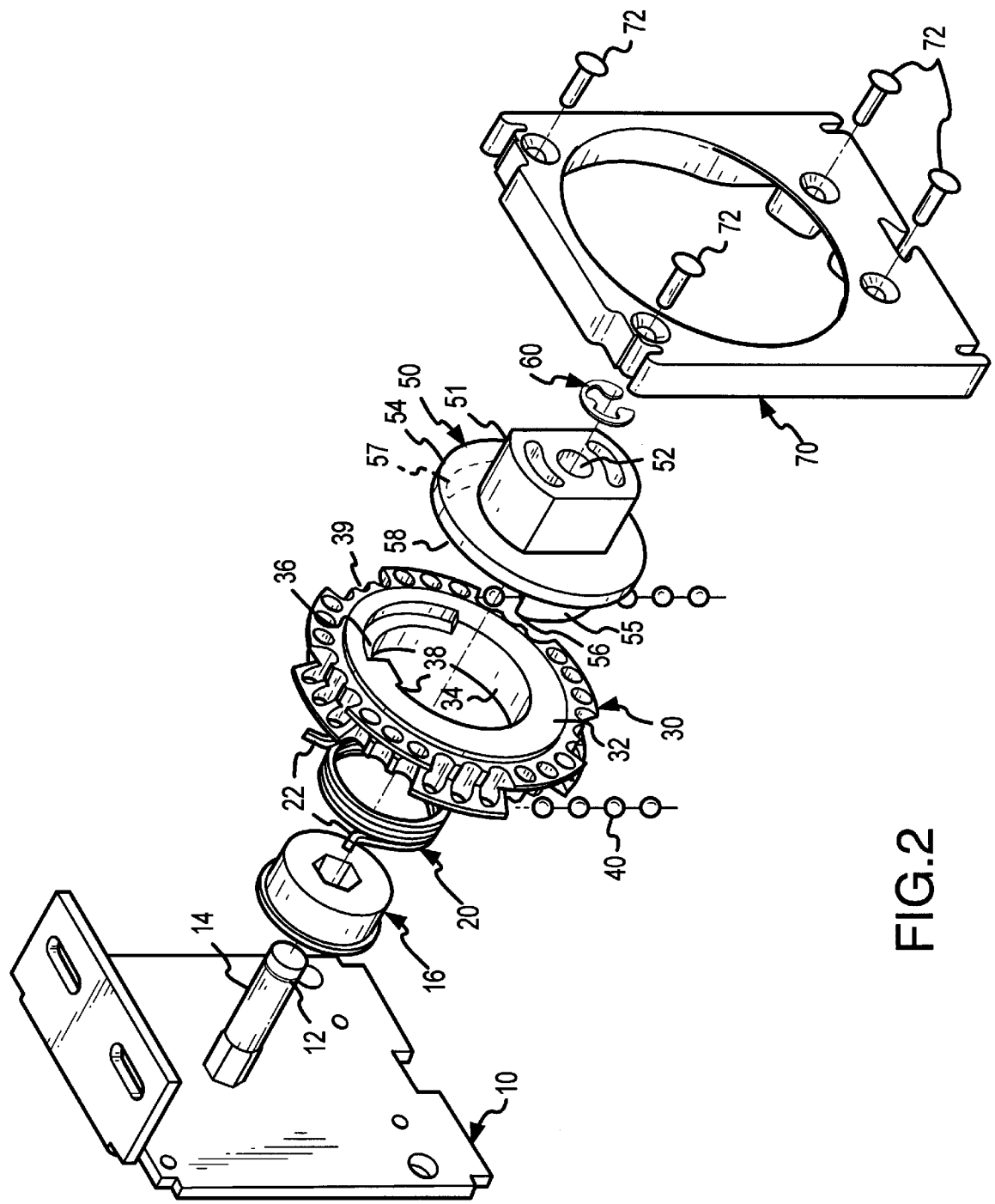
FIG. 2 shows a left exploded view of a preferred embodiment of the shade operator in accordance with the present invention.

Turning now to FIG. 2, a left exploded perspective of a preferred shade operator 1 is shown. With respect to FIG. 2, shade operator 1 preferably includes a mounting plate 10 for affixing cylindrical shaft 14, a circular stud 16 for affixing to cylindrical shaft 14, a bidirectional metal coil spring 20 for fitting around circular stud 16, a circular pulley 30 mounted for rotation around circular stud 16 and spring 20, a hub actuator support bushing 50 for ensuring the proper engagement of spring 20 and pulley 30 and for engaging tangs 22 during operation, a retaining ring 60 for ensuring that spring 20, pulley 30, and bushing 50 remain in place, a front housing cover 70 for affixing to mounting plate 10, and a means for fastening the housing cover 70 onto mounting plate 10, such as screws 72. One of ordinary skill in the art will appreciate that mounting plate 10 can be of any size, material, or shape upon which shaft 14 can be affixed. For example, mounting plate 10 can be formed of a suitable plastic or metal alloy.

Circular stud 16 is preferably composed of any material with frictional characteristics such that when the material is engaged with spring 20, an increase in the inner diameter of spring 20 will allow the spring to rotate smoothly around stud 16. Stud 16 may, therefore, be composed of any suitable metal alloy or plastic. For example, in a preferred embodiment, circular stud 16 may be composed of a self-lubricating metal, such as, sinterized steel with an oil impregnation. In an alternate embodiment, circular stud 16 may be composed of a self-lubricating plastic material with sufficiently low coefficient of friction to allow smooth rotation of spring 20, the plastic material being of sufficient hardness to resist the "grooving effect" cause by the rotation of spring 20. The "grooving effect" is the effect caused by the rotation of spring 20 around circular hub 16, wherein spring 20 cuts or wears tracks into the surface of circular stud 16. For example, a suitable plastic for circular hub 16 may be composed of a 5–10% Teflon in Delryn, or a like plastic material. One of ordinary skill in the art will appreciate that the material chosen for hub 16 will directly effect the coefficient of friction between hub 16 and spring 20, thereby effecting the level of drag friction which results from the rotation of spring 20 about hub 16.

Continuing with FIG. 2, spring 20 may be constructed of any suitable material, but is preferably constructed of spring steel of square cross-section, with tangs 22 projecting outward from the respective outermost coils of spring 20. The inner diameter of spring 20 is chosen so as to be slightly less than the diameter of hub 16, such that when spring 20 is installed upon hub 16, the spring must be stressed by spreading apart spring tangs 22 to increase the inner diameter of spring 20 to allow insertion on hub 16. For example, with a hub diameter of 0.518 inches, a spring with inner diameter of 0.510 is appropriate.

Figure 3:
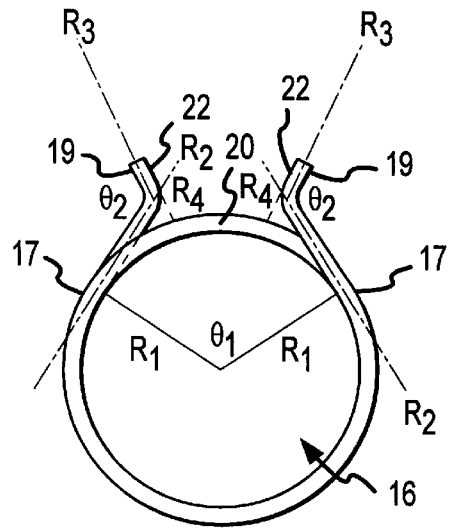
FIG. 3 shows a detailed view of a preferred embodiment of the wrap spring in accordance with the present invention.

Turning now to FIG. 3, what is depicted is a preferred embodiment of spring 20, wherein tangs 22 of spring 20 are formed in a substantially radially outward projection. Each tang at the opposite ends of spring 20 may be any configuration, including an arc or an "L"-shape or any combination thereof. However, for simplicity in the exemplary drawing figures, tangs 22 are shown as the same configuration in each drawing figure. More particularly, tangs 22 are formed having a first tang portion 19 and a second tang portion 17, wherein second tang portion 17 radiates tangentially to the circumference of spring 20 with terminal end of second tang portion 17 at the origin of first tang portion 19. The first tang portion 19 projecting outwardly from the terminal end of second tang portion 17 at a reference angle $\theta_2$, wherein reference angle $\theta_2$ is formed by reference line $R_2$ drawn coaxially to the majority projection of second tang portion 17, and by reference line $R_3$, drawn coaxially to the majority projection of first tang portion 19. Further, as shown in FIG. 3, reference lines $R_1$ are drawn from central axis of spring 20 to the origin of second tang portion 17, such that the intersection of reference lines $R_1$ form reference angle $\theta_1$. With continued reference to FIG. 3, reference line $R_4$ is drawn from the origin of second tang portion 19 to a point on the circumference of spring 20, such that $R_4$ is orthogonal to the circumference of spring 20.

Continuing with FIG. 3, the measurement of reference angles $\theta_1$ and $\theta_2$, and reference line $R_4$ have a direct relationship to the selected coefficient of friction between spring 20 and hub 16. That is, as the coefficient of friction between the spring 20 and hub 16 decreases, according to the selected material of hub 16, the measurements of reference angles $\theta_1$ and $\theta_2$, and reference line $R_4$, will also decrease. For example, in the preferred embodiment of FIG. 3, the coefficient of friction between spring 20 and hub 16 is such that reference angles $\theta_1$ and $\theta_2$ are obtuse in measure and reference line $R_4$ defines an orthogonal distance between spring 20 coil circumference, and the origin of first tang portion 19.

Figure 4:
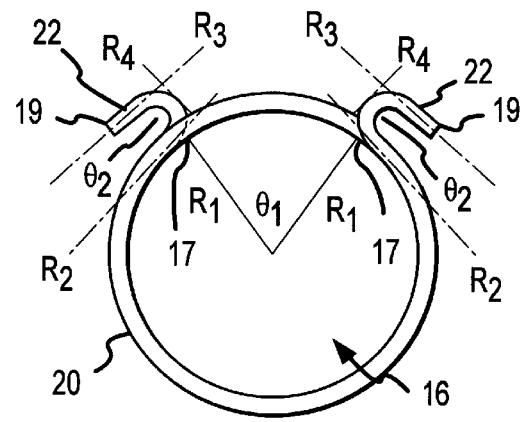
FIG. 4 shows a detailed view of an alternative embodiment of wrap spring in accordance with present invention.

An alternative embodiment of spring 20 is depicted in FIG. 4, wherein like numerals of FIG. 3 represent like elements in FIG. 4. FIG. 4 depicts a spring configuration for use with a system having a lower coefficient of friction between spring 20 and hub stud 16 than the coefficient of friction encountered in the system utilizing the FIG. 3 preferred embodiment. FIG. 4 shows a preferred embodiment of a spring used in a system with a decreased coefficient of friction over the FIG. 3 embodiment. The decrease in the coefficient of friction provides an increase in surface area of the spring 20 contacting and dragging along the surface of stud 16. In the FIG. 4 preferred embodiment, more of the second tang portion 17 is preferably in contact with the hub 16, which increases the surface area of spring 20 contacting hub 16, which also increases the drag friction along the surface of the hub 16. The increased surface area of second tang portion 17 contacting hub 16 decreases the length of reference line $R_4$, which ensures that reference angle $\theta_1$ of the FIG. 4 preferred embodiment is more acute than reference angle $\theta_1$ of the FIG. 3 preferred embodiment. In addition, FIG. 4 shows tang 22 curved substantially outward, such that reference line $R_2$ is substantially parallel to reference line $R_3$. One of ordinary skill in the art will appreciate that the curvature of tang 22 can be such that reference angle $\theta_2$ will be substantially acute in measure. The depicted spring 20 construction of FIG. 4 is preferably used with a circular hub of suitable plastic composition, but one skilled in the art will also appreciate that it can be used with a hub of suitable metal composition or any other combination of elements.

FIG. 3 and FIG. 4 depict preferred embodiments of wrap spring 20, wherein the measurements of reference angles $\theta_1$ and $\theta_2$, and reference line $R_4$ vary in a direct relationship with the coefficient of friction between spring 20 and selected hub 16. One of ordinary skill in the art will appreciate that the number of coils, width, and gauge of the wire spring, and the density of the self-lubricating hub will effect the amount of spring surface area needed to drag along the hub, thus preventing the free rotation of the shade at any position where the shade is positioned. For example, the lighter the density of the hub, the lighter the gauge of the spring which should be used, and the spring design selected should ensure that more surface area of the spring is contacting the hub.

Returning now to FIG. 2, pulley 30 may be formed of high impact plastic, nylon or similar composition. The pulley is provided with a track 39 about its outer periphery adapted to provide positive engagement with ball-chain 40 which wraps about, and hangs from, pulley 30 to provide manual operation. One skilled in the art will appreciate that ball-chain 40 can include any suitable cord, wire, or any other device for rotating pulley. The construction of ball-chain 40 is well known in the art, and is therefore not discussed, herein.

Pulley 30 is preferably further provided with a central bore 34, and a coaxial arcuate central recess 36 extending partially through the pulley 30 from pulley face 32, wherein arcuate central recess 36 is sufficiently angled to substantially accommodate the circular movement of spring tangs 22. More particularly, the inner arcuate central recess 36 defines an angle which is obtuse in measurement. Projecting inwardly from arcuate central recess 36 is projection 38, adapted to coact with spring tangs 22, as pulley 30 is rotated.

Figure 5:
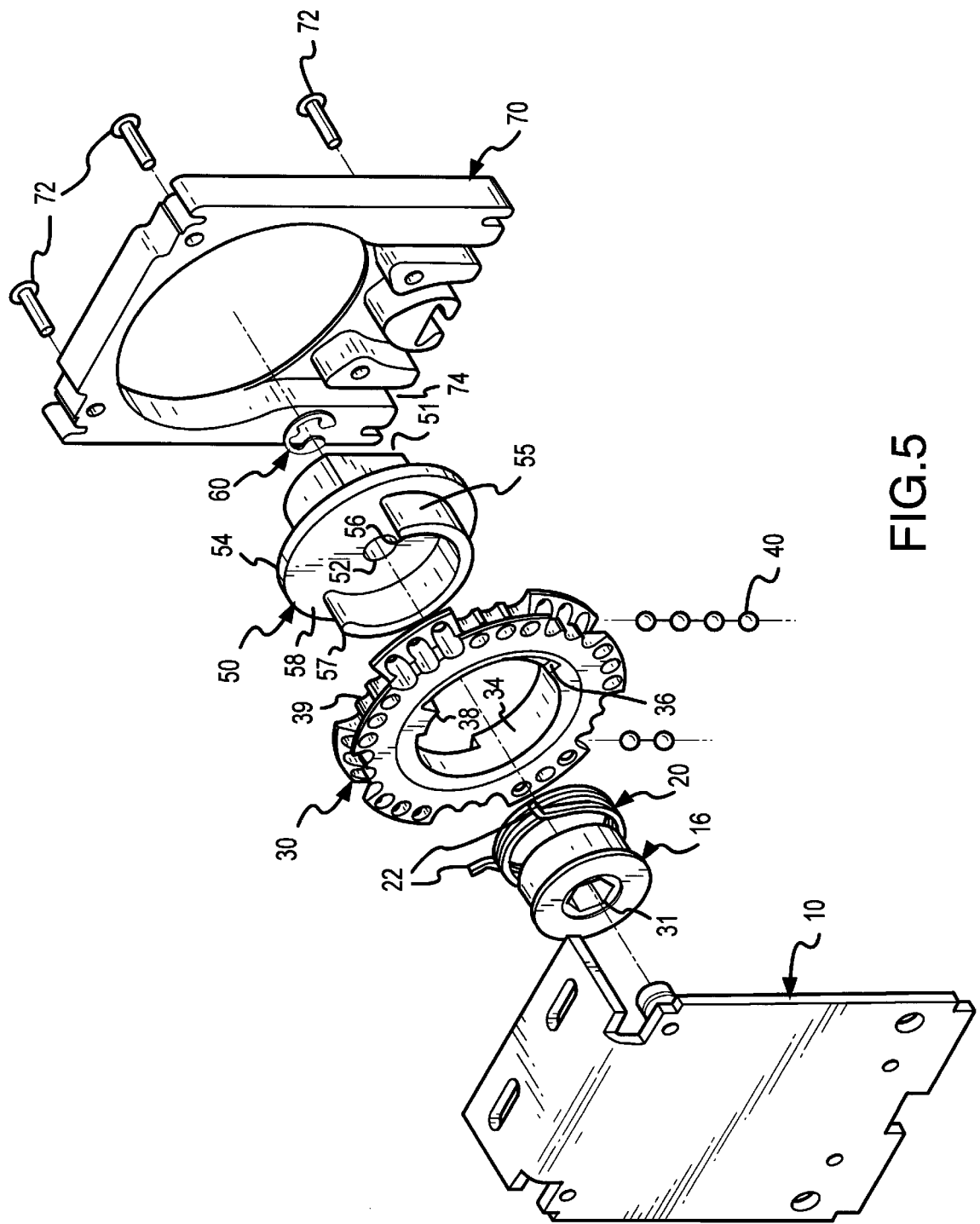
FIG. 5 shows a right exploded view of a preferred embodiment of the shade operator in accordance with the present invention.

With continued reference to FIG. 2, bushing 50 is essentially circular with a bushing head 51 adapted to fit in a suitable mating shade roller, and wherein bushing head 51 has a central bore 52 to accept shaft 14. Depending from a first end of bushing head 51 is a circular shoulder 54. FIG. 5 depicts a right exploded perspective of the aforementioned preferred shade operator 1, wherein circular shoulder 54 can best be seen. Depending from circular shoulder 54 is arcuate wall 55 of about 280 degrees having an outer diameter sized to fit within central bore 34 of pulley 30, having an inner diameter sufficient to fit over hub 16 and spring 20, such that the face 58 of circular shoulder 54 rests upon a face 32 of pulley 30. Arcuate wall 55 has radial end portions 56 and 57 spaced from, and located to, alternately embrace spring tangs 22, as bushing 50 is rotated.

Returning now to FIG. 2, pulley 30, spring 20, and bushing 50 are all maintained on hub 16 by means of a C washer 60, which fits within mating groove 12 at the distal end of shaft 14. Alternate methods of maintaining the pulley 30, spring 20, and bushing 50 onto shaft 14 are well known in the art, such as retainer nuts, and may alternatively be used.

Figure 6:
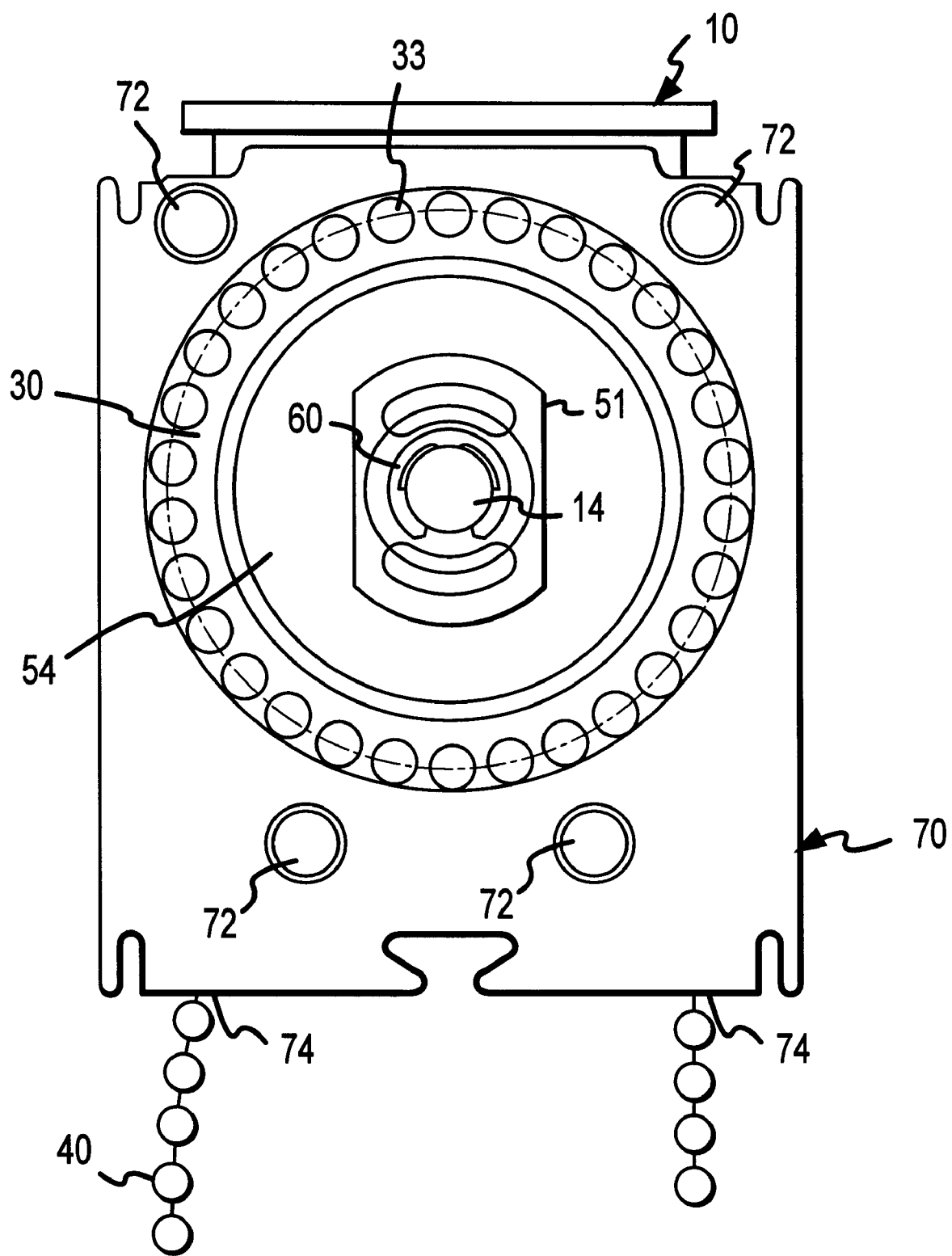
FIG. 6 shows a frontal view of a preferred embodiment of the shade operator in accordance with the present invention.

As seen in FIG. 6, the entire assembly is sealed by housing cover 70, which fits around the periphery of pulley 30, such that a channel 33 is created for ball-chain 40. Appropriate bores are provided in both the housing cover and the back plate 10 to permit the fastening of the cover and backplate together by appropriate means, such as screws 72. Housing cover 70 is also provided with exitways 74, for ball chain 20, as best seen in FIG. 5.

Figure 9:
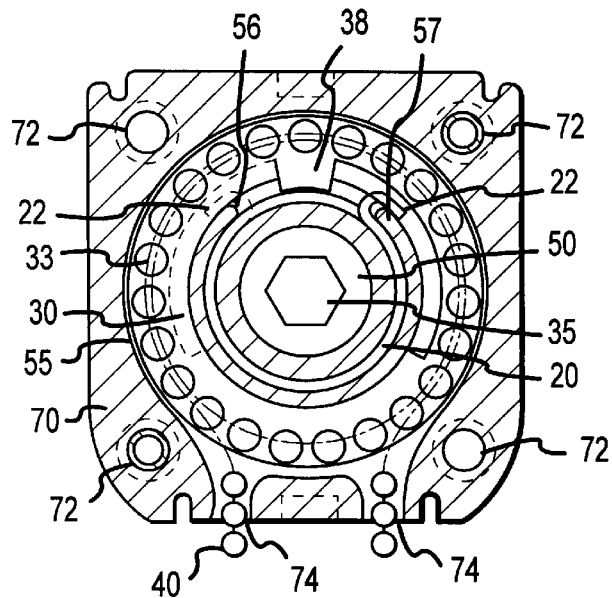
FIG. 9 shows a frontal view of an alternative embodiment of the shade operator in accordance with the present invention.
Figure 7:
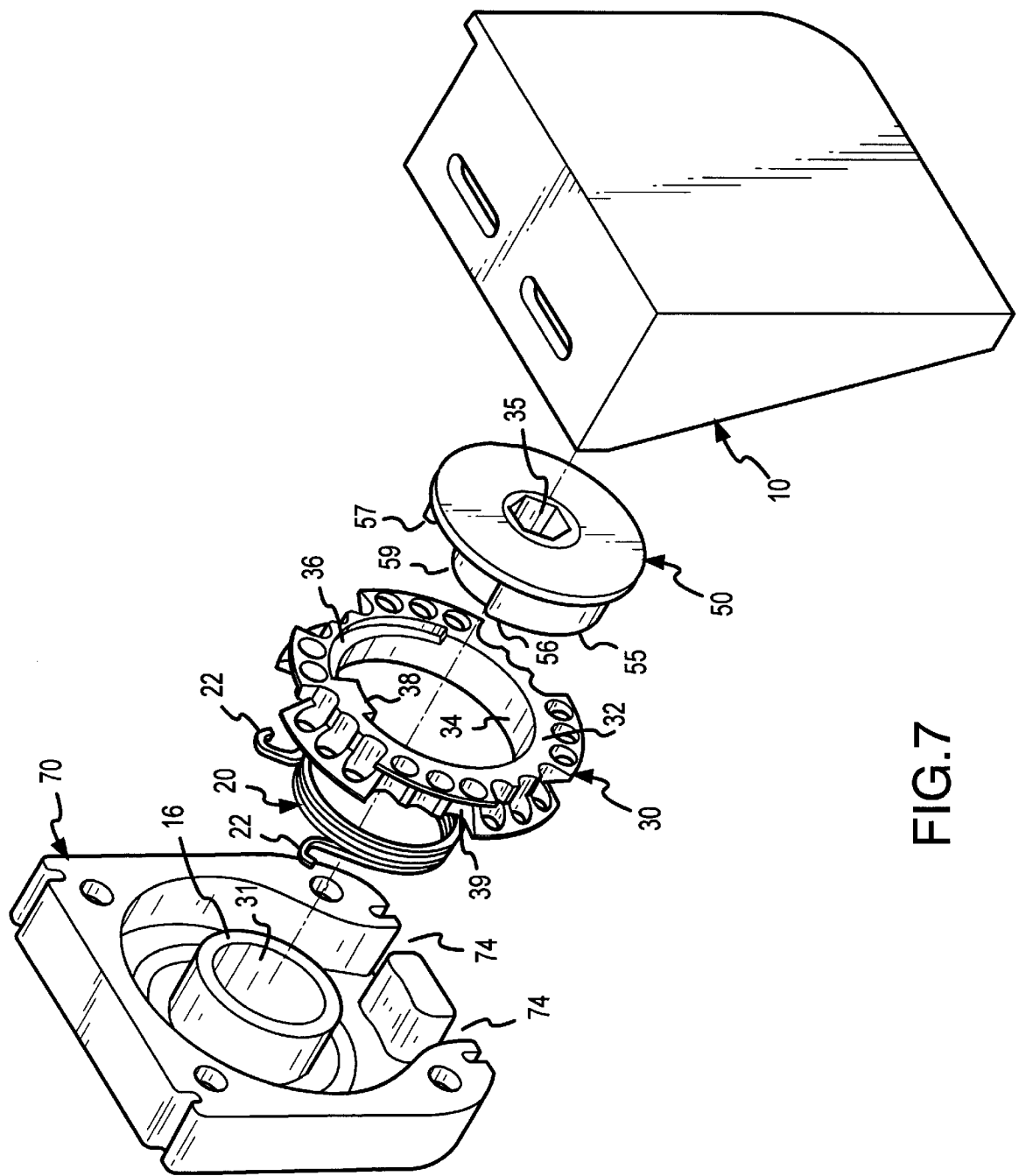
FIG. 7 shows a left exploded view of an alternative embodiment of the shade operator in accordance with the present invention.
Figure 8:
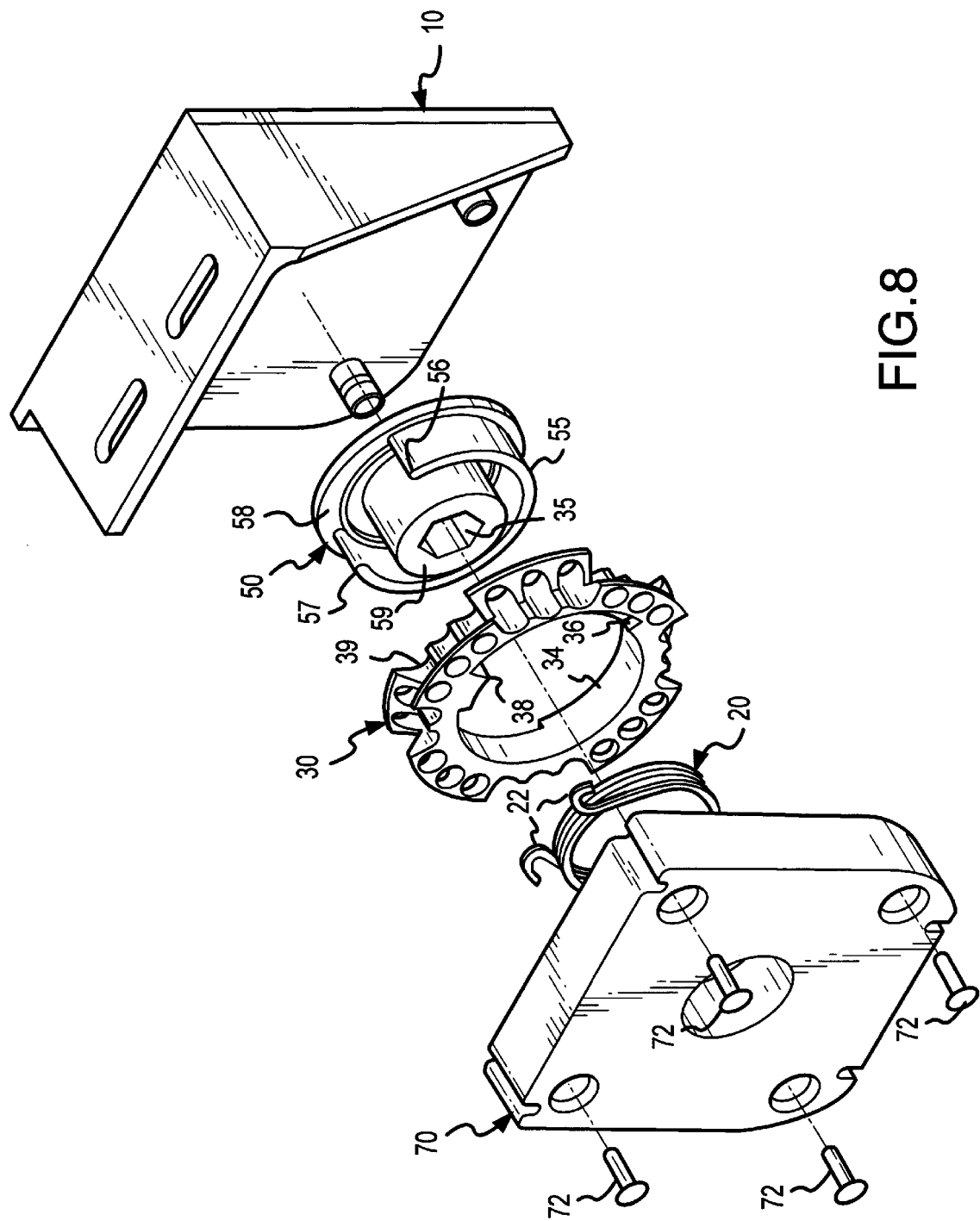
FIG. 8 shows a second left exploded view of an alternative embodiment of the shade operator in accordance with the present invention.

FIG. 7 shows a left exploded perspective of an alternative preferred embodiment of shade operator 1. In this embodiment, circular hub 16 is affixed to housing cover 70, wherein hub 16 contains a hub central bore 31, such that hub central bore 31 extends through housing cover 70. Turning now to FIG. 8, which shows a right exploded perspective of the aforementioned alternate embodiment, bushing 50 is essentially circular and has a bushing central bore 35 for accepting the mating end of a shade roller. Depending from bushing face 58 is arcuate wall 55 of about 280 degrees, having an inner diameter sufficient to fit over hub 16 and spring 20, an outer diameter sized to fit within the central bore 34 of pulley 30, such that the bushing face 58 rest upon pulley face 32. Arcuate wall 55 has radial end portions 56 and 57 spaced from and located to alternately embrace spring tangs 22, as bushing 50 is rotated. Additionally depending from bushing face 58, coaxial with bushing central bore 35, is bushing circular projection 59, such that bushing central bore 35 extends through bushing circular projection 59, and the outer diameter of bushing circular projection 59 is such that it fits within hub central bore 31 seen in FIG. 7, allowing bushing face 58 to rest upon pulley face 32. Appropriate bores are provided in both the housing cover 70 and the back plate 10 to permit fastening of the cover and backplate together by appropriate means, such as screws 72. Pulley 30, spring 20, and bushing 50 are all maintained on stud 16 when housing cover 70 and back plate 10 are fastened. As seen in FIG. 9, the housing cover 70 fits around pulley 30, such that a channel 33 is created between cover 70 and pulley 30, and exitways 74 are provided for ball-chain 40.

In use, with reference to FIG. 1, the shade roller 1 is mounted within the window frame in a conventional manner, utilizing screws or some other suitable method. Means for mounting of shade roller systems is well known in the art and are not described herein. Further, idle end bracket 3 is mounted on the opposite side of the window frame such that the axis of rotation of the idle end bracket 3 matches that of the shade roller 1. The construction of idle end bracket 3 and similar assemblies is also well known in the art and is not intended to comprise a part of the present invention and may be of conventional construction. The construction of idle end bracket 3 includes an insertion passage way to allow insertion of shade roller 4. Shade roller 4 is adapted to mate with shade operator 1, such that shade roller 4 is supported and permitted to rotate. Turning to FIG. 2, in a preferred embodiment, the mating portion of shade roller 4 may include an insertion passageway for mating with bushing head 51. In an alternative embodiment, the mating portion of shade roller 4 may include a projection for insertion into bushing central bore 35, seen in FIG. 8. Although the aforementioned means for supporting shade roller 4 are described, one skilled in the art will appreciate that numerous suitable means for supporting shade roller 4 between shade operator 1 and idle end bracket 3 exist and are well known. With the shade operator system installed as described above, the shade 5 can be raised or lowered as desired by the manual operation of the shade operator 1, as will hereinafter be explained.

Figure 10:
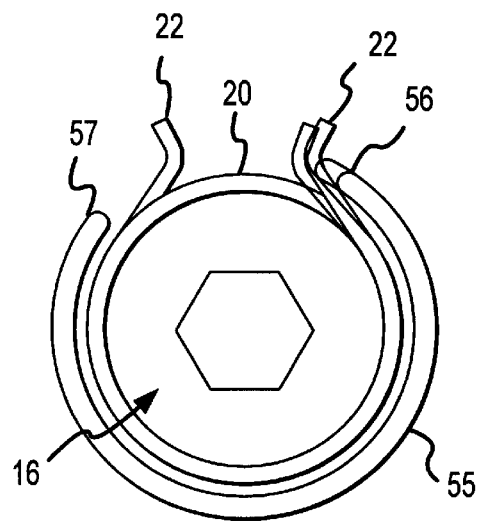
FIG. 10 shows a preferred embodiment of the present invention, wherein the bushing arcuate wall engages a tang of the wrap spring in accordance with the present invention; and, FIG. 11 shows a preferred embodiment of the present invention, wherein the pulley engages the inner surface of a spring tang thereby increasing the spring's inner diameter in accordance with the present invention.

It is well understood in the art of wrap spring clutch shade operation systems that the shade is maintained in any unrolled extent by the frictional engagement of the turns of wrap spring around a spring retainer located in rotary drive unit. More particularly, and with reference to FIG. 2, by example, shade position is maintained by the frictional engagement of the turns of wrap spring 20 against hub 16. As shown in FIG. 10, the weight of the shade exerts a torque on one of the outer radial end portions 56 or 57 of arcuate wall 55. This torque tends to compress spring 20 around hub 16, thus increasing the frictional force between the spring and hub to prevent rotation of the spring 20, pulley 30, and bushing 50.

Figure 11:
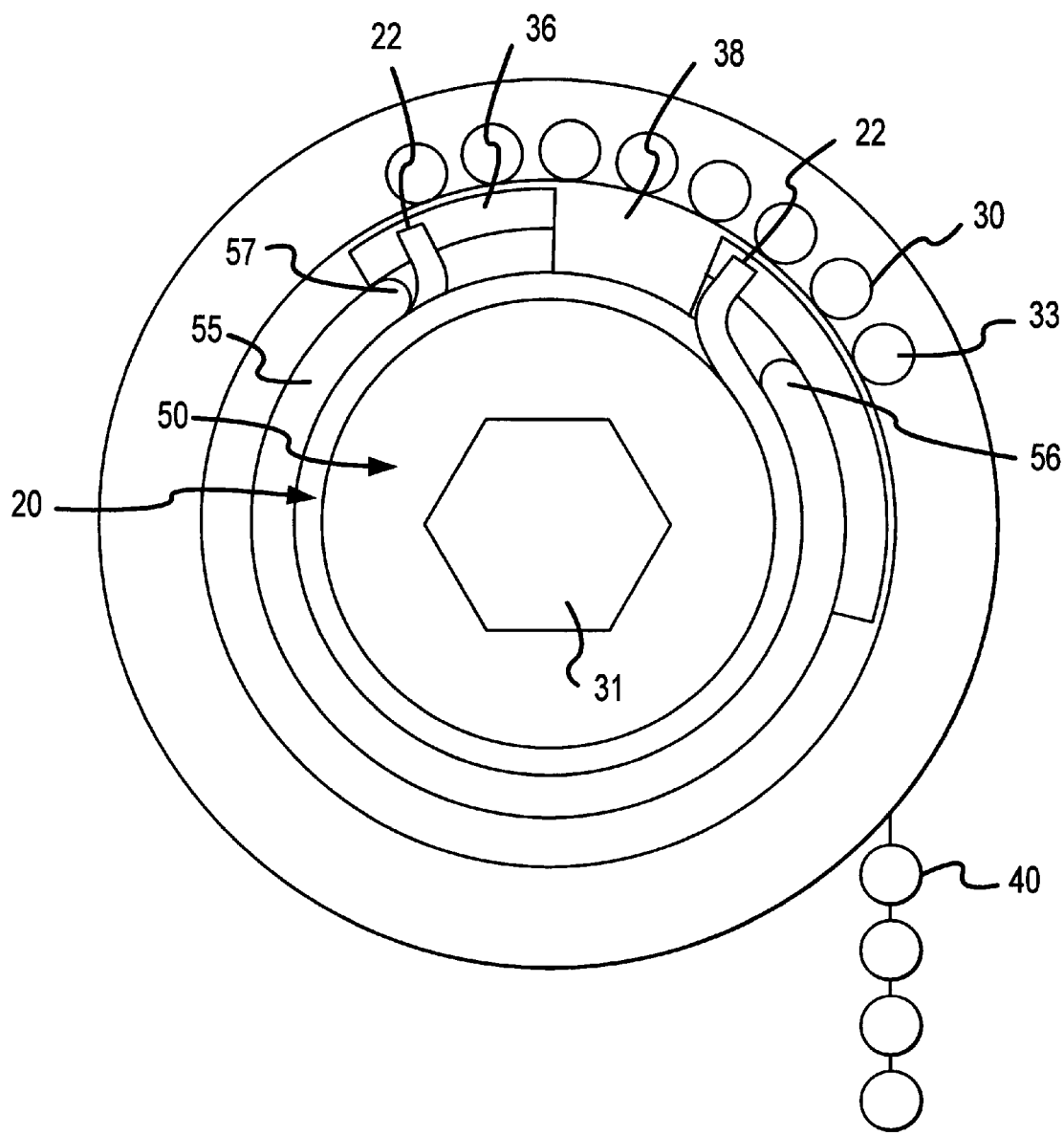

As shown in FIG. 11, manual operation of pulley 30, by ball-chain 40, causes pulley projection 38 to come in contact with one of the inner surfaces of spring tang 22. The force applied against one of the inner surfaces causes spring 20 to flex open slightly, thus lowering the frictional forces between the spring 20 and hub 16. The spring thus rotates about hub 16 with the contacted spring tang 22 driving the appropriate radial end of portions 56 or 57 of arcuate wall 55, thereby rotating bushing 50, thus raising or lowering the shade as appropriate. When the desired height is reached, ceasing the motion of the pulley releases the manual torque against the spring 20 causing the spring 20 to relax to its normal configuration, again tightly gripping stud 16 and substantially preventing additional rotation of the shade.

As the shade is lowered, additional torque is being provided by the weight of the shade, wherein the weight of the shade torques the pulley the same direction as the torque being applied by the pulley. The present invention substantially eliminates the stair-stepping effect caused by the additional torque by controlling the frictional engagement between spring 20 and hub 16. With continued reference to FIG. 2, in a preferred embodiment of the present invention, the shape of spring tangs 22 alters the amount of surface area of the spring contacting the shaft 16, thereby giving greater control to the frictional drag resulting when the spring is rotated. In an alternative embodiment, seen in FIG. 8, the shape of the spring tangs 22 is such that there is increased spring surface area contacting the hub 16, resulting in increased frictional drag between spring 20 and hub 16. In addition to the aforementioned spring constructions, the present invention utilizes a self-lubricating hub whose frictional characteristics allow a smooth rotation of the wrap spring, in order to eliminate the stair-stepping effect seen in the prior art. Consequently, the particular spring construction used in the preferred embodiment will depend upon the hub selected and the level of frictional drag necessary to overcome stair-stepping. For example, if it is preferred that there be an increased frictional drag to keep the shade at the desired position, then the spring embodiment of FIG. 4, which has increased surface area contacting the hub, may be preferred. Further, if it is preferred that there be a lessened frictional drag to allow for smoother rotation of the wrap spring around the hub, then the spring embodiment seen in FIG. 3, may be preferred.

While the present invention has been described in conjunction with preferred embodiments set forth in the drawings, figures and specification, it will be appreciated that the invention is not so limited. For example, other sizes, shapes, materials and components can be incorporated into the device. Various modifications, selections and arrangements of components and materials may be made without departing from the scope of the invention as set forth in the appended claims.

What is claimed is:

1. A wrap spring clutch system comprising:
   (a) a mounting plate;
   (b) a hub mounted on a shaft projecting from said mounting plate;
   (c) a pulley in the form of a circular plate having first and second parallel sides, said pulley having a central bore for passage of said hub;
   (d) a metal coil spring mounted on and frictionally engaging said hub within said central bore of said pulley, said spring having a first tang at one end and a second tang at the opposite end of said spring, wherein said first and second tangs project outward from the circumference of said spring based upon the coefficient of friction of said hub, said spring having tangs in the shape of at least one of an arc and an "L"-shape, and (e) an essentially cylindrical hub actuator support bushing for ensuring positive contact between said pulley, hub, and spring.

2. A system according to claim 1, wherein said spring tangs include a first and second extension, wherein said first extension extends tangentially from said spring circumference, said second extension extending from the distal end of said first extension, the angle between said first and second extension being obtuse in measure.

3. A system according to claim 1 wherein said tangs include a first, second, and third extension, wherein said first extension extends tangentially from the circumference of said spring, said second extension begins at and extends from the distal end of said first extension, said second extension forming an arc of approximately n radians, said third extension beginning at and extending from the distal end of said second extension, said third extension being substantially parallel to said first extension.

4. A system according to claim 1, wherein said pulley has:
(a) an operator track on its outer edge, said operator track being adapted to accept ball-chain means for manually operating said pulley;
(b) a coaxial arcuate central recess extending partially through said first parallel side of pulley, said recess having a first, second, and third wall, wherein said recess is adapted to accommodate the radial movement of said first tang of said coil spring, said first wall being constructed to abut said first tang of said coil spring reducing the frictional engagement of said coil spring and hub as the pulley is rotated;
(c) a coaxial arcuate central recess extending partially through said second parallel side of pulley, said recess having a first, second, and third wall, wherein said recess is adapted to accommodate the radial movement of said second tang of said coil spring, said second wall being constructed to abut and rotate against the inside surface area of said second tang of said spring reducing the frictional engagement of said spring and hub as the pulley is rotated.

5. A system according to claim 1 wherein, said front housing cover provides exitways for said ball-chain means for manually rotating said pulley.

6. A system according to claim 1, wherein said hub actuator has as arcuate shoulder projecting from a face thereof, concentric with said central bore of said hub, wherein said hub actuator being mounted on said hub such that said bushing face rest upon said pulley and said arcuate shoulder extends within said central bore of said pulley where said shoulder rest between said pulley and said spring such that the ends of said arcuate shoulder alternatively contacts and engages said spring first and second tangs, said actuator driving said spring tang into said hub, thereby increasing the frictional engagement between said spring and said hub.

7. A wrap spring clutch system comprising:
(a) a mounting plate;
(b) a hub mounted on a cylindrical shaft projecting from said mounting plate, said shaft comprising a metal impregnated with additives to modify the frictional characteristics, thereof;
(c) a pulley in the form of a circular plate having first and second parallel sides, said pulley having a central bore for passage of said hub;
(d) a metal coil spring mounted on and frictionally engaging said hub within said central bore of said pulley, said spring having a first tang at one end and a second tang at the opposite end of said spring, wherein said first and second tang project outward from the circumference of said spring based upon the coefficient of friction of said hub, said spring having tangs in the shape of at least one of an arc and an "L"-shape; and,
(e) a cylindrical hub actuator support bushing for ensuring positive contact between said pulley, hub, and spring.

8. A system according to claim 7, wherein said pulley has:
(a) an operator track on its outer edge, said operator track being adapted to accept ball-chain means for manually operating said pulley;
(b) a coaxial arcuate central recess extending partially through said first parallel side of pulley, said recess having a first, second, and third wall, wherein said recess is adapted to accommodate the radial movement of said first tang of said coil spring, said first wall being constructed to abut the inside surface area of said first tang of said coil spring reducing the frictional engagement of said coil spring and hub as the pulley is rotated;
(c) a coaxial arcuate central recess extending partially through said second parallel side of pulley, said recess having a first, second, and third wall, wherein said recess is adapted to accommodate the radial movement of said second tang of said coil spring, said second wall being constructed to abut the inside surface area of said second tang of said coil spring reducing the frictional engagement of said coil spring and hub as the pulley is rotated.

9. A system according to claim 7 wherein, said front housing cover provides exitways for said ball-chain means.

10. A system according to claim 7, wherein said hub actuator has as arcuate shoulder projecting from a face thereof, concentric with said central bore of said hub, wherein said hub actuator being mounted on said hub such that said bushing face rest upon said pulley and said arcuate shoulder extends within said central bore of said pulley where said shoulder rest between said pulley and said spring such that the ends of said arcuate shoulder alternatively contacts and engages said spring first and second tangs, said actuator alternatively contacts and engages said spring first and second tangs, said actuator driving said spring tang into said hub, thereby increasing the frictional engagement between said spring and said hub.

11. A wrap spring clutch system comprising:
(a) a mounting plate;
(b) a cylindrical hub projecting from said mounting plate, said hub comprising Teflon in Delryn to modify the frictional characteristics, thereof;
(c) a pulley in the form of a circular plate having first and second parallel sides, said pulley having a central bore for passage of said hub;
(d) a metal coil spring mounted on and frictionally engaging said hub; and,
(e) means for maintaining said pulley and spring onto said hub.

12. A method of fabricating a wrap spring clutch system comprising the steps of:
(a) providing a mounting plate;

(b) mounting a hub on a shaft projecting from said mounting plate;

(c) passing said hub through a central bore of a pulley in the form of a circular plate having first and second parallel sides;

(d) mounting a metal coil spring on said hub within said central bore of said pulley, said spring having a first tang at one end and a second tang at the opposite end of said spring, (e) projecting said first and second tangs outward from the circumference of said spring based upon the coefficient of friction of said hub, said spring having tangs in the shape of at least one of an arc and an "L"-shape, and (f) ensuring positive contact between said pulley, hub, and spring, using an essentially cylindrical hub actuator support bushing.

* * * * *

UNITED STATES PATENT AND TRADEMARK OFFICE
CERTIFICATE OF CORRECTION

| | | |
|---|---|---|
| PATENT NO. | : 6,164,428 | Page 1 of 2 |
| APPLICATION NO. | : 09/379065 | |
| DATED | : December 26, 2000 | |
| INVENTOR(S) | : Joel Berman et al. | |

It is certified that error appears in the above--identified patent and that said Letters Patent is hereby corrected as shown below:

On the Title page, section (57), in the fifth line, please delete "stud" and insert therefor --hub--.

On the Title page, section (57), in the eighth line, please delete "stud" and insert therefor --hub--.

On the Title page, section (57), in the tenth line, please delete "stud" and insert therefor --hub--.

On the Title page, section (57), in the thirteenth line, please delete "stud" and insert therefor --hub--.

On the Title page, section (57), in the fifteenth line, please delete "stud" and insert therefor --hub--.

On the Title page, section (57), in the seventeenth line, please delete "stud" and insert therefor --hub--.

On the Title page, section (57), in the twentieth line, please delete "stud" and insert therefor --hub--.

In column 2, line 58, please delete "stud" and insert therefor --hub--.

In column 2, line 59, please delete "stud" and insert therefor --hub--.

In column 2, line 62, please delete "stud" and insert therefor --hub--.

In column 2, line 66, please delete "stud" and insert therefor --hub--.

In column 3, line 4, please delete "stud" and insert therefor --hub--.

In column 3, line 6, please delete "stud" and insert therefor --hub--.

In column 3, line 8, please delete "stud" and insert therefor --hub--.

In column 4, line 14, please delete "stud" and insert therefor --hub--.

In column 4, line 16, please delete "stud" and insert therefor --hub--.

In column 4, line 17, please delete "stud" and insert therefor --hub--.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 6,164,428

In column 4, line 29, please delete "stud" and insert therefor --hub--.

In column 4, line 33, before "16.", please delete "stud" and insert therefor --hub--.

In column 4, line 33, before "16 may", please delete "stud" and insert therefor --hub--.

In column 4, line 35, please delete "stud" and insert therefor --hub--.

In column 4, line 37, please delete "stud" and insert therefor --hub--.

In column 4, line 45, please delete "stud" and insert therefor --hub--.

In column 5, line 38, please delete "stud".

In column 5, line 45, please delete "stud" and insert therefor --hub--.

In column 7, line 20, please delete "stud" and insert therefor --hub--.

In column 8, line 11, please delete "stud" and insert therefor --hub--.

In column 9, line 58, please delete "shaft" and insert therefor --hub--.

In column 10, line 48, please delete "Teflon" and insert therefor --polytetraflouroethylene--.

In column 10, line 48, please delete "Delryn" and insert therefor --polyoxymethylene--.

In column 10, line 49, please delete "characteristics," and insert therefor --characteristics--.